United States Patent

[11] 3,596,147

| [72] | Inventors | Dominick J. Zeppieri<br>North Adams;<br>Charles E. Wright, Clarksburg, both of,<br>Mass. |
|---|---|---|
| [21] | Appl. No. | 821,742 |
| [22] | Filed | May 5, 1969 |
| [45] | Patented | July 27, 1971 |
| [73] | Assignee | Sprague Electric Company<br>North Adams, Mass. |

[54] ELECTRICAL CAPACITOR HAVING IMPROVED TERMINAL WIRE CONNECTION
7 Claims, 3 Drawing Figs.

| [52] | U.S. Cl. | 317/230, 317/260 |
|---|---|---|
| [51] | Int. Cl. | H01g 9/05 |
| [50] | Field of Search | 317/230, 231, 233, 260; 219/93; 29/25.42 |

[56] References Cited
UNITED STATES PATENTS

| 2,020,408 | 11/1935 | Fruth | 317/230 |
| 2,861,115 | 11/1958 | Berg | 136/28 |
| 2,932,153 | 4/1960 | Bernard et al. | 317/230 |
| 3,015,759 | 1/1962 | Bugel et al. | 317/230 |
| 3,067,488 | 12/1962 | Bennett et al. | 219/93 |
| 3,256,468 | 6/1966 | Jenny et al. | 317/230 |
| 3,443,164 | 5/1969 | Hazzard | 317/230 |

*Primary Examiner*—James D. Kallam
*Attorneys*—Connolly and Hutz, Vincent H. Sweeney, James Paul O'Sullivan and David R. Thornton ABSTRACT: An electrical capacitor having foil electrodes is provided wherein the foils are connected to novel terminal wire connections along a ribbed portion of said wires. The wire irregularity permits consistent wrinkle-free, high quality, foil-to-wire welds to be made.

ELECTRICAL CAPACITOR HAVING IMPROVED TERMINAL WIRE CONNECTION

BACKGROUND OF THE INVENTION

The present invention relates to electrical capacitors having foil electrodes and, more particularly, to an improved connection of the capacitor terminals to the foil electrodes.

When forming an electrical capacitor, a pair of metal foils having opposite polarity are separated by a dielectric material and wound into the familiar compact roll and inserted into a casing. The external connections to these foil electrodes are most conveniently made by securing a wire along the end of the foil with both ends of the wire extending beyond the foil a sufficient distance so that, after rolling and encasing, the wire ends are available for further connection. The method generally employed to secure the terminal wires to a foil is by resistance spot welding of the foil along the abutting wire length. This method has certain disadvantages; it is apt to cause wrinkles along the foil length; it is a relatively slow process since only one weld can be made at one time; the foil-wire combination causes a poor heat balance and causes welds of uncertain quality resulting in significant flash test rejections. It is often necessary to wrap the foil an extra two turns around the wire and weld at additional points to insure proper foil-to-wire contact.

It is therefore an object of this invention to provide a capacitor having a terminal-to-foil connection without the above disadvantages.

SUMMARY OF THE INVENTION

This invention relates to a foil-electrode type electrical capacitor and more particularly to the improved weld attachment of capacitor terminals to the foil electrodes. The wires which are welded to the foil ends have previously been deformed along the weld area to create a plurality of projecting or ribbed areas. These projections make it possible to use resistance projection welding to join the foil to the wire. With this method, the foil is welded to the wire at the projection points with few welding operations. The foil remains wrinkle free and, inasmuch as the heat produced by the welding is localized at the projection points, the ensuring weld is exceptionally strong. The greater reliability of the weld, in turn, makes it unnecessary to wrap the foil around the wire and reweld.

DESCRIPTION OF THE INVENTION

Figure 1:
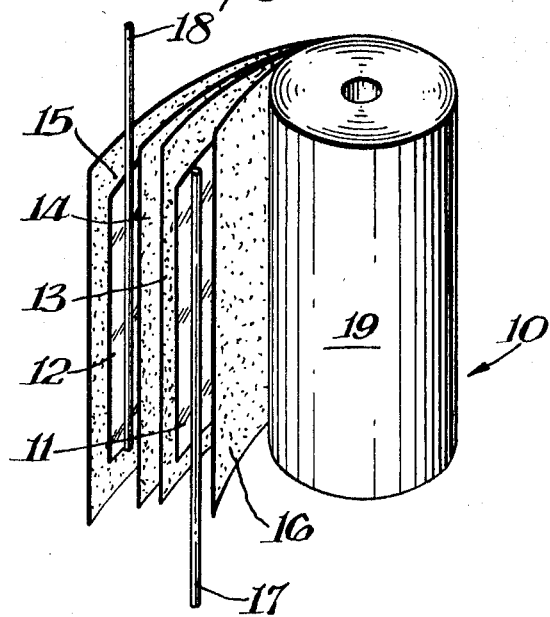
FIG. 1 shows a capacitor assembly of the rolled type having the improved terminal-to-foil connection.

Referring to FIG. 1, there is shown a capacitor 10 embodying the electrode terminal combination of the present invention. Capacitor 10 comprises a pair of tantalum foils 11 and 12 having a dielectric oxide film on the surface thereof. Between foils 11 and 12 are one or more sheets of dielectric spacer material 13, 14, 15 and 16 composed conventionally of kraft paper or other suitable spaced material of a porous nature used to separate the foils. Terminal wires 17 and 18 which are described in greater detail below, are secured to respective foils 11 and 12 and extend from the foils in opposite directions. The electrode foils and dielectric sheets are wound into a compact roll 19 which can then be inserted into a casing (not shown).

Figure 2:
FIG. 2 shows a length of terminal wire formed according to the invention.
Figure 3:
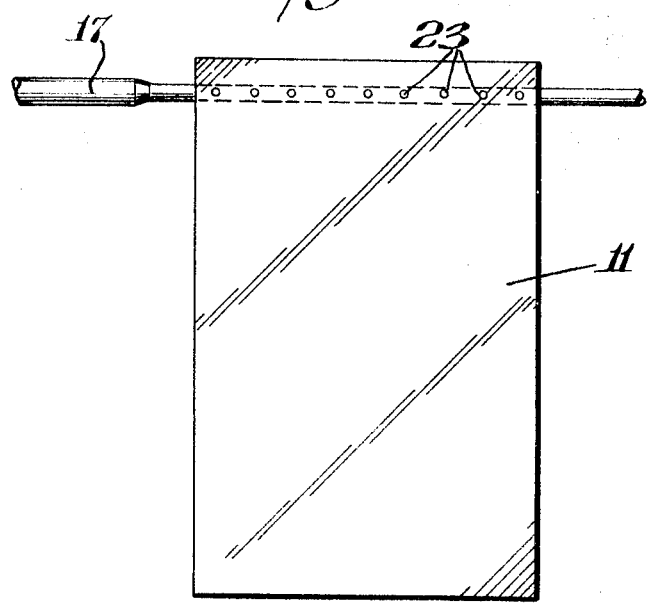
FIG. 3 shows a foil welded in place along the ribbed portion of the terminal wire.

The attachment of the electrode foils to the terminal wires is more fully shown in FIGS. 2 and 3. Referring to FIG. 2, wire 17 (or 18) is a conventional 0.025 in diameter tantalum wire excepting for ribbed portion 20 which has been flattened to a 0.014 in diameter to create a plurality of raised elements or projections 21 each approximately 0.003 to 0.005 in high. The total length of these ridges is designed to be completely covered by the length of foil electrode 11 (shown in FIG. 3). The proposed foil welding area is cleaned of oxide film, if necessary, and the wire is welded to the bared foil surface.

The wire may be formed into the desired raised projection pattern by placing the wire between two dies and effectively stamping the wire into the desired configuration. While the projections are shown equally spaced, they may be randomly spaced and a greater or less number may be effectively used than that shown. It is desirable, however, to have a projection at both ends so that a weld connection can be made to both ends of the overlying foil.

Foil 11 is attached to the tantalum wire along the ridged portion of the wire and more particularly at each projection point. The attachment is effected by resistance projection welding wherein a pair of electrodes hold the wire and foil together under pressure and an electrode current flows between the electrode and through the work parts. This current flow through the workpiece creates heat which, in turn, induces coalescence.

Successful welds have been obtained on the above foil embodiments by applying electrode pressure at 30 p.s.i. and employing a voltage ranging from 775 to 900 volts from a capacitor discharge power supply rated at 200 $\mu$f. The resulting welds 23, FIG. 3, are localized at the projection points, producing a weld superior to the spot welding method. And, since the foil is stretched from projection to projection, there is no opportunity for wrinkling to occur.

The dimensions of the projection will depend to some degree upon the thickness of the foil. Experimentation has shown that the optimum height of a projection would be the foil thickness times a factor of six. Greater or less projection heights tend to cause excessive current and "burns" across the weld points.

It has been found that the improved terminal wire connections can be made to foils comprising a variety of materials including tantalum, titanium, stainless steel and aluminum. As to the latter, there is a marked superiority in welding aluminum according to the present invention compared to the conventional spot welding techniques on nonridged wire. It is very difficult to effect a union of aluminum foil to a terminal because of the low melting point of aluminum. The aluminum will tend to fracture during the welding and to melt onto the electrode surfaces. With the present technique, the aluminum melts across the top of the contacted projection creating a wetting action along its upper surface. In this case, the wire projections will penetrate through the foil and the resultant union can be more properly described as a fusion stretching or a brazing union.

It is a further feature of the invention that a capacitor may comprise a pair of foils of different materials but having the novel terminal wire connections. For example, referring to FIG. 1, an aluminum foil 11 can be the capacitor cathode and a tantalum foil 12 can be the anode. The dielectric can then be an oxide film of the tantalum. Both foils are welded to tantalum wires 17 and 18 respectively by the above-described welding process. This combination is used most effectively in an electrolytic capacitor wherein a preferred electrolyte (not shown) is placed between the dielectric and the aluminum foil. The resulting capacitor has all the preferable qualities associated with tantalum capacitors and yet is less expensive to produce due to the use of the relatively inexpensive aluminum for the tantalum.

What we claim is:

1. An electrical capacitor comprising in combination a pair of elongated thin foil electrodes separated by a dielectric material, at least one wire terminal having a raised projection pattern area along a portion of its length and a plurality of projections spaced apart along said raised projection pattern area, weld connections between said spaced-apart projections and the metal surface of one of said foil electrodes; and portions of said foil electrode stretched between said projections whereby the foil electrode is attached along the raised projection pattern area of the wire in stretched condition and free of wrinkles.

2. The capacitor of claim 1 wherein said wire terminal is tantalum.

3. The capacitor of claim 2 wherein the capacitor is an electrolytic capacitor having an aluminum foil cathode, a tantalum foil anode and a dielectric film comprising an oxide of said tantalum.

4. The capacitor of claim 1 wherein the terminal-to-foil connection is effected by a resistance projection welding process.

5. The capacitor of claim 4 wherein the ratio of the diameter of said wire to the height of said projections is approximately six to one.

6. The capacitor of claim 1 wherein a second wire terminal has a raised projection pattern area and a plurality of spaced-apart projections and weld connections between said second wire terminal projections and the other of said foil electrodes.

7. The capacitor of claim 1 wherein the total length of distribution of said spaced-apart projections on said wire terminal is less than the width of said foil electrode.